US011258731B2

(12) United States Patent
Albrecht et al.

(10) Patent No.: US 11,258,731 B2
(45) Date of Patent: Feb. 22, 2022

(54) BOT PROXY FOR GROUP COMMUNICATION SERVICE

(71) Applicant: Orion Labs, San Francisco, CA (US)

(72) Inventors: Greg Albrecht, San Francisco, CA (US); Jesse Robbins, San Francisco, CA (US)

(73) Assignee: Orion Labs, Inc., San Francisco, CA (US)

( * ) Notice: Subject to any disclaimer, the term of this patent is extended or adjusted under 35 U.S.C. 154(b) by 0 days.

(21) Appl. No.: 17/000,161

(22) Filed: Aug. 21, 2020

(65) Prior Publication Data

US 2021/0058346 A1 Feb. 25, 2021

Related U.S. Application Data

(60) Provisional application No. 62/890,241, filed on Aug. 22, 2019.

(51) Int. Cl.
*G06F 15/16* (2006.01)
*H04L 51/02* (2022.01)
*H04L 67/56* (2022.01)
*H04L 51/10* (2022.01)
*G10L 15/26* (2006.01)

(52) U.S. Cl.
CPC .............. *H04L 51/02* (2013.01); *H04L 51/10* (2013.01); *H04L 67/28* (2013.01); *G10L 15/26* (2013.01)

(58) Field of Classification Search
CPC ......... H04L 51/02; H04L 51/10; H04L 67/28; G10L 15/26

USPC ........................................................ 709/206
See application file for complete search history.

(56) References Cited

U.S. PATENT DOCUMENTS

| | | | | |
|---|---|---|---|---|
| 6,259,969 B1 * | 7/2001 | Tackett | ................... | G06N 3/006 700/264 |
| 6,301,609 B1 * | 10/2001 | Aravamudan | ........... | H04L 51/26 707/999.001 |
| 6,314,410 B1 * | 11/2001 | Tackett | ................... | G06N 20/00 706/11 |
| 6,363,301 B1 * | 3/2002 | Tackett | ................... | G06N 20/00 700/246 |

(Continued)

OTHER PUBLICATIONS

Bechtel, R., "Meet The Chatbot Radiohead Launched 15 Years Ago," Apr. 13, 2016, Chatbots Magazine, https://chatbotsmagazine.com/radiohead-s-googlyminotaur-ee91cd600a4a (retrieved Apr. 5, 2021), pp. 1-14. (Year: 2016).*

(Continued)

*Primary Examiner* — Alicia Baturay (57) ABSTRACT

Methods, systems, and software are disclosed herein for secured system access by means of a bot proxy for a bot within a group communication service. In an example embodiment, a bot within a selected group of a group communication service may receive a message from a user of the selected group. The bot may transmit, to a bot proxy node within a secured local network, information related to the message that is relevant to executing a selected command. The bot proxy node, in turn, may transmit an application programming interface (API) instruction to perform the selected command to a target server within the secured local network. The bot may send a response message, via the group communication service, to at least one user from the selected group based on a result of the selected command.

20 Claims, 6 Drawing Sheets

(56) References Cited

U.S. PATENT DOCUMENTS

| | | | | |
|---|---|---|---|---|
| 6,430,602 | B1 * | 8/2002 | Kay | H04L 51/04 709/206 |
| 6,604,090 | B1 * | 8/2003 | Tackett | G06N 20/00 706/11 |
| 6,629,087 | B1 * | 9/2003 | Benson | G06F 40/232 706/11 |
| 6,907,571 | B2 * | 6/2005 | Slotznick | G06Q 10/107 706/11 |
| 6,993,555 | B2 * | 1/2006 | Kay | H04L 51/04 709/202 |
| 7,146,404 | B2 * | 12/2006 | Kay | G06F 21/41 709/206 |
| 7,266,585 | B2 * | 9/2007 | Kay | G06F 21/41 709/202 |
| 7,287,057 | B2 * | 10/2007 | Lagarde | H04L 51/04 709/204 |
| 7,454,469 | B2 * | 11/2008 | Zhou | H04L 51/04 704/9 |
| 7,603,413 | B1 * | 10/2009 | Herold | G06Q 10/10 709/204 |
| 7,630,986 | B1 * | 12/2009 | Herz | G06Q 10/10 |
| 7,702,665 | B2 * | 4/2010 | Huet | G06F 40/30 707/602 |
| 7,783,486 | B2 * | 8/2010 | Rosser | G10L 15/22 704/270 |
| 7,861,252 | B2 * | 12/2010 | Uszok | H04L 67/10 719/317 |
| 7,877,349 | B2 * | 1/2011 | Huet | G06F 40/30 707/602 |
| 8,019,383 | B2 * | 9/2011 | Kossi | H04W 88/04 455/553.1 |
| 8,086,850 | B2 * | 12/2011 | Ghosh | H04L 9/0836 713/163 |
| 8,224,906 | B2 * | 7/2012 | Mikkonen | G06F 16/90332 709/206 |
| 8,341,221 | B2 * | 12/2012 | Verlare | G06Q 10/107 709/204 |
| 8,438,233 | B2 * | 5/2013 | Mallet | H04L 51/04 709/206 |
| 8,775,529 | B2 * | 7/2014 | Wright | H04L 69/08 709/206 |
| 9,064,278 | B2 * | 6/2015 | Fan | G06Q 50/01 |
| 9,118,462 | B2 * | 8/2015 | Khambete | H04L 9/0822 |
| 9,219,744 | B2 * | 12/2015 | Baliga | H04L 63/1425 |
| 9,503,866 | B2 * | 11/2016 | Corson | H04W 8/186 |
| 9,661,445 | B2 * | 5/2017 | Abraham | H04L 29/08423 |
| 9,680,658 | B2 * | 6/2017 | Goel | H04L 12/1822 |
| 9,705,840 | B2 * | 7/2017 | Pujare | H04L 51/04 |
| 9,936,010 | B1 * | 4/2018 | Robbins | H04B 1/385 |
| 10,116,596 | B2 * | 10/2018 | Li | H04L 12/1813 |
| 10,164,930 | B2 * | 12/2018 | Sun | G06Q 50/01 |
| 10,165,017 | B2 * | 12/2018 | Lin | H04L 67/12 |
| 10,223,432 | B2 * | 3/2019 | Harden | H04L 51/32 |
| 10,305,686 | B2 * | 5/2019 | Albrecht | H04L 63/065 |
| 10,321,166 | B2 * | 6/2019 | Albrecht | H04N 21/233 |
| 10,360,611 | B2 * | 7/2019 | Zhang | G06Q 30/0625 |
| 10,404,794 | B2 * | 9/2019 | Juhlin | H04L 67/1044 |
| 10,410,107 | B2 * | 9/2019 | Romero | G06F 21/31 |
| 10,419,489 | B2 * | 9/2019 | Kalia | G06F 40/211 |
| 10,425,774 | B2 * | 9/2019 | Robbins | H04W 4/50 |
| 10,447,711 | B2 * | 10/2019 | Kaminsky | G06F 21/31 |
| 10,462,620 | B2 * | 10/2019 | Albrecht | H04M 3/58 |
| 10,673,787 | B2 * | 6/2020 | Koohmarey | G06F 40/30 |
| 10,687,178 | B2 * | 6/2020 | Robbins | G10L 15/1822 |
| 10,783,503 | B2 * | 9/2020 | Fan | H04N 21/2541 |
| 10,798,028 | B2 * | 10/2020 | Fung | H04L 51/046 |
| 10,862,961 | B2 * | 12/2020 | Juhlin | H04L 67/1068 |
| 10,897,433 | B2 * | 1/2021 | Robbins | G06F 16/61 |
| 10,923,125 | B2 * | 2/2021 | Albrecht | H04L 12/282 |
| 10,929,485 | B1 * | 2/2021 | Chew | G06F 16/9038 |
| 10,965,623 | B2 * | 3/2021 | Robbins | H04L 61/2069 |
| 2003/0131061 | A1 * | 7/2003 | Newton | H04L 63/0281 709/206 |
| 2003/0220972 | A1 * | 11/2003 | Montet | H04L 51/04 709/204 |
| 2007/0294229 | A1 * | 12/2007 | Au | H04M 1/72403 |
| 2014/0279050 | A1 * | 9/2014 | Makar | G06F 16/9535 705/14.66 |
| 2015/0023342 | A1 * | 1/2015 | Joo | H04L 67/1087 370/350 |
| 2017/0289070 | A1 * | 10/2017 | Plumb | H04L 51/16 |
| 2018/0278555 | A1 * | 9/2018 | Robbins | H04L 61/2069 |
| 2018/0278557 | A1 * | 9/2018 | Robbins | H04L 51/02 |
| 2018/0309805 | A1 * | 10/2018 | Robbins | H01L 21/02675 |
| 2019/0141486 | A1 * | 5/2019 | Lu | H04W 28/0215 |
| 2019/0188590 | A1 * | 6/2019 | Wu | H04L 51/02 |
| 2020/0372909 | A1 * | 11/2020 | Albrecht | G10L 15/22 |
| 2021/0012774 | A1 * | 1/2021 | Sureka | G10L 15/1815 |
| 2021/0064643 | A1 * | 3/2021 | Folland | G06F 40/56 |
| 2021/0075835 | A9 * | 3/2021 | Robbins | H01L 21/308 |

OTHER PUBLICATIONS

Zaleski, A., "The oral history of Radiohead's GooglyMinotaur, a chatbot ahead of its time," Jun. 23, 2016, The A.V. Club, https://music.avclub.com/the-oral-history-of-radiohead-s-googlyminotaur-a-chatb-1798248780 (retrieved Apr. 5, 2021), pp. 1-35. (Year: 2016).*

* cited by examiner

BOT PROXY FOR GROUP COMMUNICATION SERVICE

RELATED APPLICATIONS

This application hereby claims the benefit of and priority to U.S. Provisional Patent Application No. 62/890,241, entitled "BOT PROXY FOR GROUP COMMUNICATION SERVICE", filed on Aug. 22, 2019, which is hereby incorporated by reference in its entirety.

BACKGROUND

Group communication services can facilitate secure communications between multiple user nodes in a distributed communication environment. Members of a communication group can send messages that are broadcast to multiple other members of the group through personal communication devices in approximately real-time, over communication networks such as the internet. These communication groups allow teams or friends to stay connected even when far apart and on the move.

As individuals grow accustomed to easy and quick access to information, a way to integrate data access capabilities into a communication group would improve the robustness and appeal of group communication services. Further, allowing employees of a company to access the data and software of the company while the employees are on the move, by way of a group communication service, could improve work efficiency. However, the data and the computer systems on which the data and software are stored are valuable assets, and these assets must be protected from unauthorized access and tampering through the internet. Therefore data and computer systems may be located within a secured local network, behind protective systems such as firewalls that may interfere with access to these assets by users through a group communication service.

OVERVIEW

Technology is disclosed herein for integration of a bot application into a group communication service, which bot can access a protected network through a bot proxy interface node in response to messages from users of the group communication service. In an example embodiment, a bot within a selected group of a group communication service may receive a message from a user of the selected group. The bot may transmit, to a bot proxy node within a secured local network, information related to the message that is relevant to executing a selected command. The bot proxy node, in turn, may transmit an application programming interface (API) instruction to perform the selected command to a target server within the secured local network. The bot may send a response message, via the group communication service, to at least one user from the selected group based on a result of the selected command.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

In the following detailed description of certain embodiments, reference is made to the accompanying drawings which form a part hereof, and which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on one or more computer processors or controllers. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
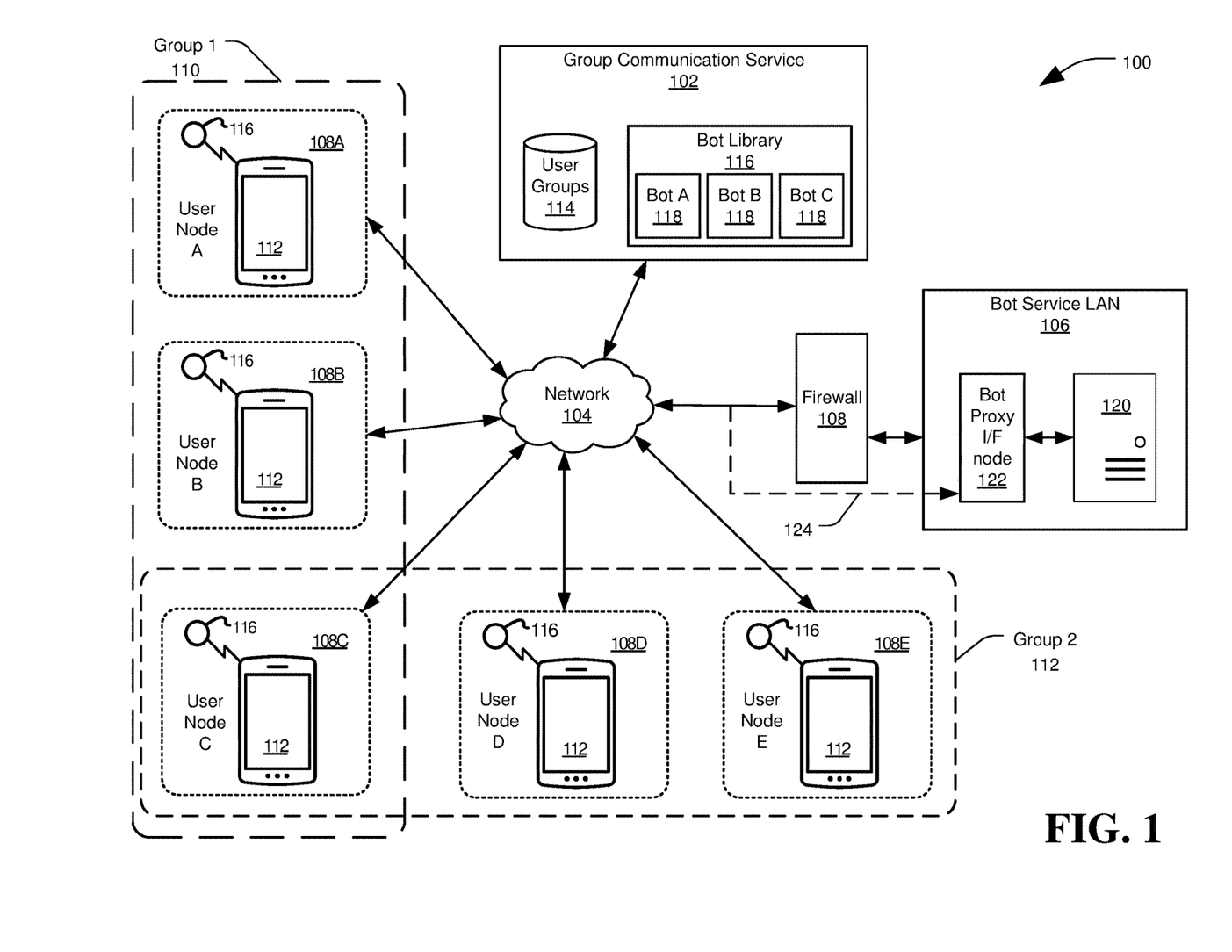
FIG. 1 is a diagram of a system including a bot proxy for a group communication service, in accordance with certain embodiments of the present disclosure.

FIG. 1 depicts a diagram of a system 100 including a bot proxy for a group communication service, in accordance with certain embodiments of the present disclosure. The system 100 may include a group communications service (GCS) 102 (which may also be referred to as a group messaging service), a network 104, a bot service local area network (LAN) 106, and a plurality of user nodes 108A-108E. The network 104 may be a wide area network (WAN), such as the internet, connecting computing devices over a large geographical area.

The GCS 102 may include one or more computers, servers, or other systems to facilitate communication between user nodes 108A-108E. The GCS 102 may permit communications between user nodes 108 in the form of audio messages transmitted via an over-the-top (OTT) communication service, which may use one or more networks 104, such as the internet, thereby bypassing telecommunications platforms.

The GCS 102 may allow user nodes 108A-108E to join or be added to one or more communication groups, such as group 1 110 and group 2 112. Communication groups may include selected groupings of a subset of users less than all users of the GCS 102. User nodes within a group may be able to communicate with other user nodes within the same group, via network 104 and GCS 102. Access to a group may be restricted based on receiving an invitation from a creator or an administrator for the group, based on entering a secure password for a group, or other access-restriction methods. In an example, group 1 110 may include only employees of a particular company, allowing teams of employees to stay in communication with each other while working. In another example, a group may be established for fans of a particular television series so that the fans can discuss the series as a group.

In some examples, the GCS 102 may transmit communications from a user node 108 within a group to all other user nodes 108 within the same group, in a general broadcast. The GCS 102 may also permit a user node 108 to transmit a private message to a selected one or more users of a group to which the transmitting user node 108 is a member. User communications may be in the form of audio messages, which may be transmitted from the user node 108 over the network 104 to the GCS 102, and then broadcast from the GCS 102, over the network 104, to all other user nodes 108 in the same group as the broadcasting user node. For example, a user of user node A 108A may speak a message, which may be captured and transmitted as an audio transmission over network 104 to GCS 102, which may in turn broadcast the message to user node B 108B and user node C 108C in approximately real-time.

The GCS 102 may maintain a user group database 114. The user group database 114 may store information regarding all established user groups, and may include identifying information for which user nodes 108 are included in each group. For example, the user group database 114 may include a listing for group 1 110 that includes user or device identifiers for user node A 108A, user node B 108B, and user node C 108C, and a listing for group 2 112 that includes identifiers for user node C 108C, user node D 108D, and user node E 108E. As shown, a user node may be a member of multiple groups, as with user node C 108C being a member of both group 1 110 and group 2 112. When a user node is a member of multiple groups, messages from that user node may be broadcast to only users of a selected group identified by the transmitting user node 108C (e.g. only broadcast to Group 1 110), or the message may be broadcast to all groups to which the user node is a member.

Each user node 108 may include a transmission device 112 capable of connecting to the network 104, such as a mobile phone, computer, smart watch, or similar device. A user node 108 may also include one or more personal devices 116 that can link to the transmission device 112, such as via wired or wireless connections, including Wi-Fi®, Bluetooth®, and Bluetooth low energy (BLE). The personal device 116 may be configured to receive and send messages to and from the user of the user node 108 by way of the transmission device 112. In an example embodiment, the personal device 116 may include a wearable speaker and microphone, such as a wearable pendant or headset, which can receive messages from a user (e.g. recording audio messages to transmit when a 'transmit' button on the personal device 116 is held down) and broadcast messages received from other users of a participant group.

The GCS 102 may also allow for one or more bots 118 to be added to a communication group. A bot 118 may be a software application configured to execute commands in response to messages from users of a group to which the bot has been added. For example, a bot 118 may be added to group 1 110, being included in the group database 114 as either a user or special bot participant of group 1 110. A user node 108 within a group to which a bot 118 has been added may transmit a message including a trigger phrase that activates functionality of the bot 118. For example, user node A 108A may send a message, "Weatherbot, what is the forecast for Tuesday?". A participant bot 118 within group 1 110 may respond to the trigger phrase "Weatherbot" and may identify a request within the message to retrieve a weather forecast for Tuesday. In response, the bot 118 may send Tuesday's forecast to members of group 1 110.

Bots 118 may be in the form of computer executable code stored to a memory and which, when executed, causes one or more computer processors to perform the bot's operations. Bots 118 may be stored and executed externally to the GCS 102, for example being run at a bot service LAN 106 or another computer such as a transmission device 112. Externally hosted bots 118 may be added to group(s) through the user group database 114 as a normal user node, with group messages sent to and received from the computer running the bot 118 via the network 104.

In another example, bots 118 may be stored to and executed by a computer system of the GCS 102. For example, the GCS 102 may maintain a bot library 116 of bots hosted or executed by the GCS 102, such as bots A, B, and C 118. An administrator for a group or the GCS 102 may add a bot as a participant of a group through the user group database 114. When a message is received at the GCS 102 from a user node 108 of, e.g. group 1 110, the GCS may look up the group 1 participants in the database 114 and determine whether a bot 118 is a member of group 1 110. If so, the GCS 102 may perform operations on the message according to the program code for the participant bot(s) 118.

In another example, a program may be stored at and executed by the GCS 102 that scans user messages for trigger phrases for a bot 118. If a trigger phrase is detected, the GCS 102 may send the message to a computing device external to the GCS 102 that executes the code for the respective bot 118. Other embodiments are also possible for managing bot integration into a group through the GCS 102.

Functionality or information for a bot 118 may be provided by a service external to the GCS 102, such as at bot service LAN 106. For example, the bot service LAN 106 may include one or more computers or servers 120, which can store information that can be accessed by a bot 118, or which can perform calculations or operations on behalf of a bot 118. For example, the bot service LAN 106 may include a weather service, with a server 120 storing weather information for various geographical regions. In another example, the bot service LAN 106 may include a hotel, with a server 120 having software and data of a work flow system for the hotel staff, including rooms to be cleaned or items to be delivered to hotel patrons. An administrator for the hotel bot service LAN 106 may request that a hotel workflow bot 118 be added to the bot library 116, so that the hotel workflow bot 118 can be added to a communication group limited to staff for the hotel. Hotel staff may send communications through the GCS 102 to the hotel workflow bot 118 to access or update data at the hotel server 120 to determine jobs to be performed or to report when a task has been completed.

Computers 120 located within a bot service LAN 106 may include sensitive information that should be protected from unauthorized accesses over the network 104. To this end, the bot service LAN 106 may include a firewall 108 to protect computers 120 within the bot service LAN 106. The firewall 108 may be a network security system in the form of computers or software that filters traffic to or from bot service LAN 106 over the network 104.

In order to facilitate communication and data access to computers 120 of the bot service LAN by an associated bot 118, the bot service LAN 106 may include a bot proxy interface (I/F) node 122. The bot proxy I/F node 122 (sometimes referred to herein as simply a bot proxy or bot proxy node) may include software running on a computer or server 120 of the bot service LAN 106, or may include a dedicated computing device configured to perform the operations of the bot proxy described herein.

The bot proxy 122 may be configured to receive all access requests or commands from a bot 118 to the bot service LAN 106, process the requests, and transmit messages from the bot service LAN 106 to the bot 118. Messages to and from the bot proxy 122 may pass through the firewall 108, or may optionally bypass (124) the firewall 108. The bot proxy node may be configured to shield computers 120 of the bot service LAN 106 from direct internet access, and may prevent unauthorized communications (e.g. communications not received from an authorized bot 118) from reaching secured servers 120 within the bot service LAN 106. For example, the bot 118 associated with the bot proxy 122 may be configured to encrypt or digitally sign messages to the bot proxy 122 with a private key or another encryption method, so that only messages using the appropriate encryption can be decoded by the bot proxy 122 and allowed access to other computers 120 within the bot service LAN 106.

The bot proxy 122 may be configured to format requests or commands from the bot 118 into a particular format, such as by generating an application program interface (API) instruction recognized or accepted by a target server 120 in order to instruct the server 120 to execute the command. The bot proxy 122 may perform other operations on messages received from the bot 118, such as load balancing (e.g. distributing requests among multiple servers 120 to prevent overloading or delays at any particular server), routing commands to a target server 120 from multiple servers based on which bot-requested operations each server is configured to execute, compressing or decompressing data messages, caching recently or frequently accessed data from the servers 120, or performing other processing operations. An example implementation of the system 100 is discussed in greater detail in regards to FIG. 2.

Figure 2:
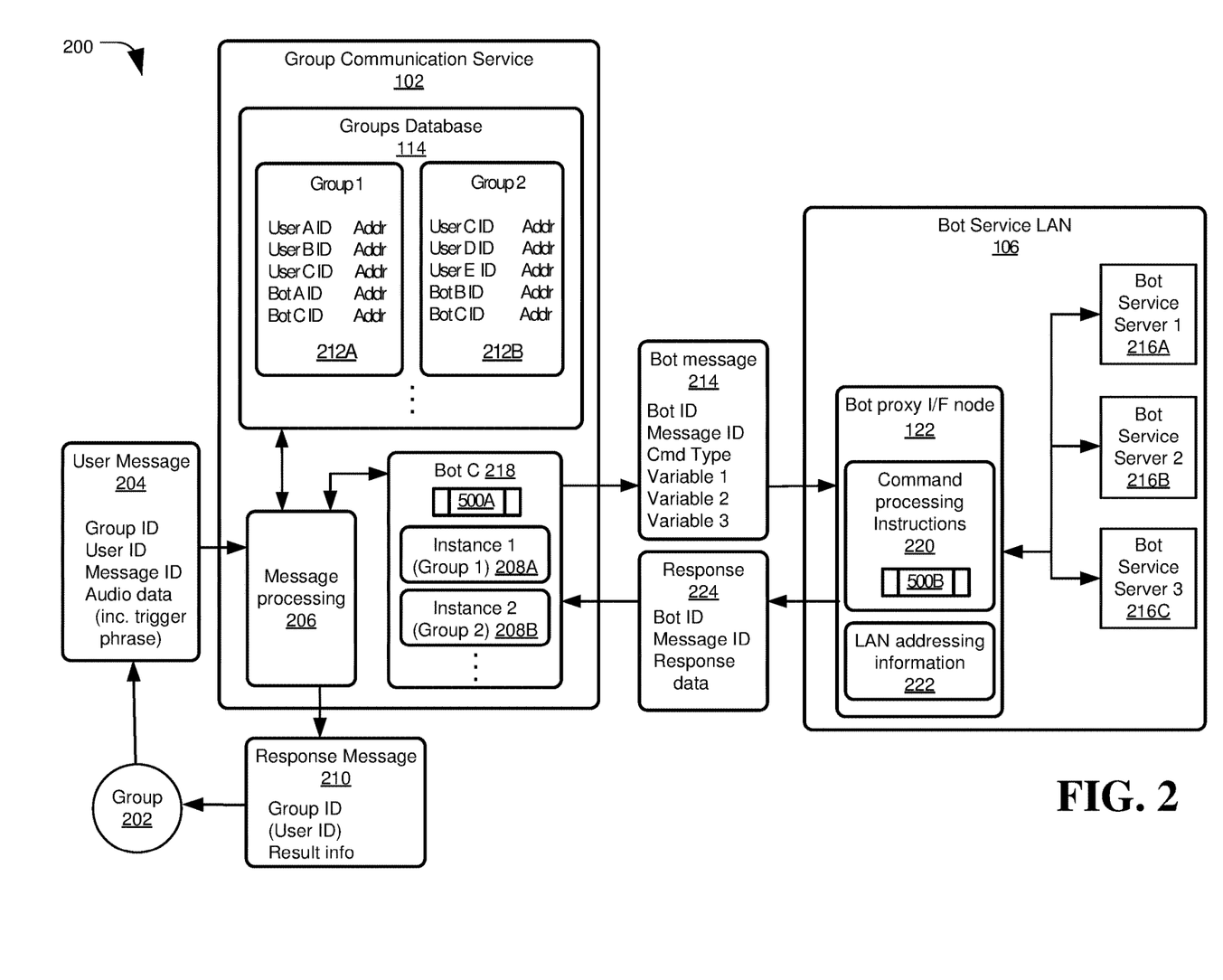
FIG. 2 is a diagram of a system including a bot proxy for a group communication service, in accordance with certain embodiments of the present disclosure.

FIG. 2 depicts a diagram of a system 200 including a bot proxy for a group communication service, in accordance with certain embodiments of the present disclosure. System 200 may correspond to system 100 of FIG. 1, and reference may be made to elements from system 100 via corresponding identifier numbers. The system 200 may include a group 202 of at least one user nodes, a group communication service (GCS) 102 executing a bot C 218, and a bot service LAN 106 including a bot proxy I/F node 122. FIG. 2 depicts an example implementation by which bot functionality may be invoked via the group communication server 102 and used to access the bot service LAN 106 via the bot proxy 122.

A user message 204 may be sent (e.g. over network 104) from a user node of group 202 to the GCS 102. The user message 204 may be generated by a user device (e.g. transmission device 112 or personal device 116) of a user node 108. For example, a personal device 116 may capture audio data from a spoken message from a user. The audio data may be encoded, compressed, or otherwise processed at a device of the user node 108, and may be included with other identifying information in the user message 204 to transmit to the GCS 102. Identifying information that may be included with the user message 204 may include a group identifier (ID) for the group to which the message is being transmitted, a user ID associated with the user node sending the message, a message ID for the user message 204, other identifying information, or any combination thereof. The user message 204 may be split into one or more data packets sent over the network 104 to the GCS 102.

The user message 204 may be received at the GCS 102 and undergo message processing, for example at message processing module 206. Message processing 206 may include extracting information from user message 204, such as identifying information and audio data. Message processing 206 may also include performing data compression or decompression, error correction for corrupted data packets or other problems, audio data adjustments to balance sound levels or message clarity, speech-to-text conversion, other processing operations, or any combination thereof.

During message processing 206, the GCS 102 may extract the group ID from the user message 204, and access the communication groups database 114 to determine other user nodes within the group 202 to which to send the user message 204. In the depicted example embodiment, the groups database 114 includes a first listing 212A of member user nodes and bots of group 1, and a second listing 212B for member user nodes and bots of a group 2, as well as listings for other communication groups. Each listing 212 may include identifying information for users and bots within the group. For example, each user node or bot may have a unique identifier, an internet protocol (IP) address to which messages should be sent, or other identifying information. The listing 212 may also identify whether a member bot is hosted at and should be processed by the GCS 102, or that the bot is hosted externally to the GCS 102. Particular users or bots may be included in multiple groups. For example, user C and bot C may be included in the listings for group 1 212A and group 2 212B. If a bot is included in more than one group, such as bot C 218, a different unique instance of the bot C 218 may be included in each group, or a single bot instance may handle messages from all groups to which the bot C 218 is a member. A bot instance may be a distinct processing thread that operates independently of other processing threads for the same bot. In an example, bot C 218 may include a first instance 208A for processing messages from group 1, and a second instance 208B for processing messages from group 2.

The GCS 102 may forward or transmit the user message 204 to other user nodes 108 within the group 202, such as to all member user nodes of the group 202 or to specific target user nodes identified in the user message 204. If the GCS 102 determines that the group 202 includes one or more bots hosted by the GCS 102, the GCS 102 may invoke the bot(s) based on receiving the user message 204. For example, group 202 may include bot C 218, and so the GCS 102 may send user message 204 to bot C 218. In some embodiments, all user messages from a group in which bot C 218 is a member will be sent to bot C 218, while in other embodiments only messages that invoke the functionality of bot C 218 may be sent to bot C 218. To identify whether the user message 204 invokes bot C 218, the audio data may be scanned by the message processing node 206 or the bot C 218 software for one or more trigger phrases. Trigger phrases may include a name for bot C 218, or a specific command that bot C 218 recognizes (e.g. "what is the weather?"). The audio data may be scanned for a trigger phrase directly (e.g. by searching the audio data for a recognized audial data sequence), or by first converting the audio data to another format. For example, the audio data may undergo speech-to-text conversion during message processing 206 or by the bot C 218 to generate a text version of the audio data, and then the text may be scanned for a trigger phrase.

As explained above, the processor or computer executing bot C 218 may run or maintain multiple instances of bot C 218 for handling messages from different groups, such as instance 1 208A and instance 2 208B. A user message 204 may be provided to the instance corresponding to the group from which the user message 204 was received.

Figure 5:
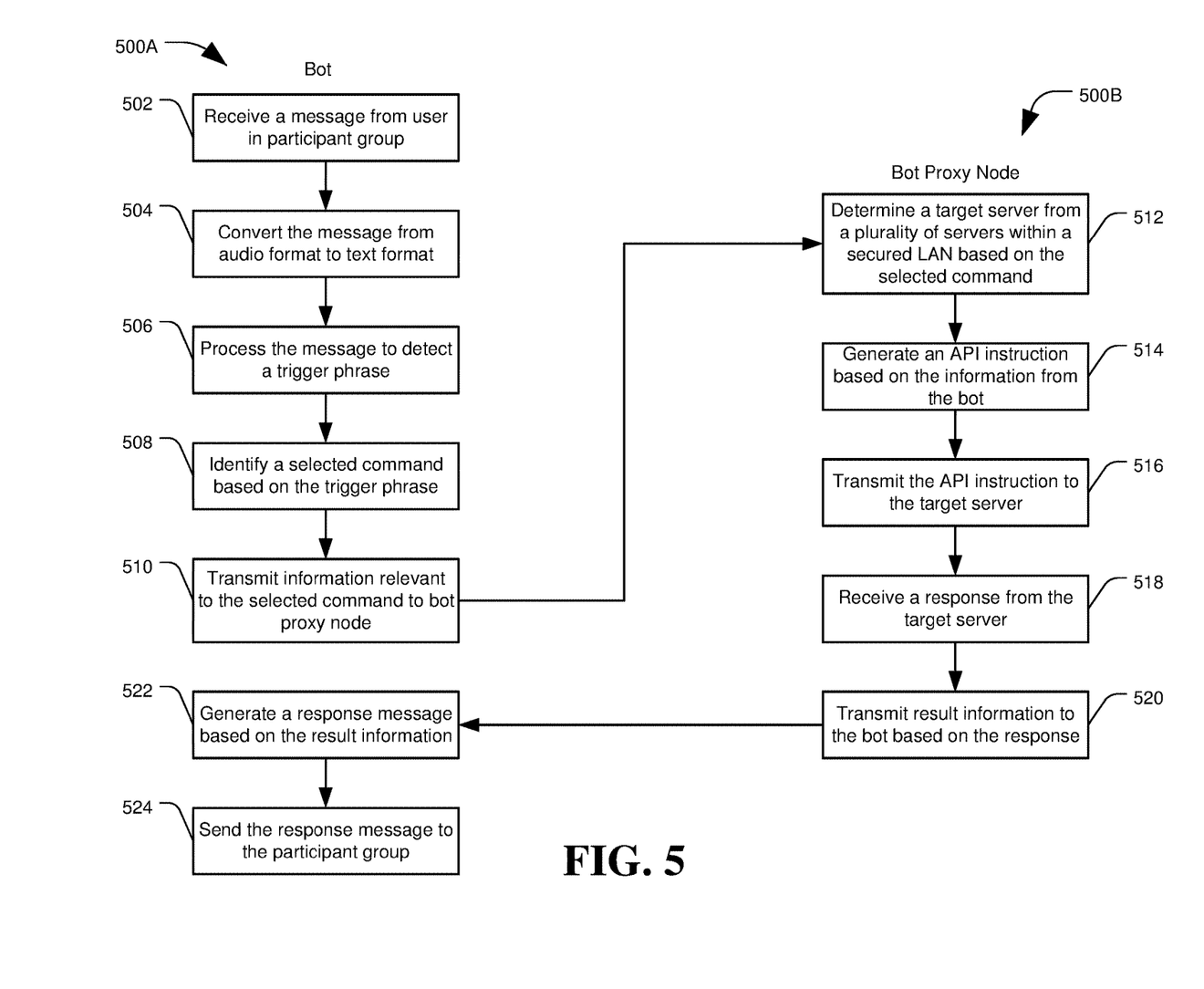
FIG. 5 is a flow diagram for a method of using a bot proxy for a group communication service, in accordance with certain embodiments of the present disclosure.

Bot C 218 may execute program code or method 500A based on receiving a message, where 500A may correspond to the method flow diagram 500A of FIG. 5. Bot C 218 may process the user message 204, which may include converting the audio data into a text message or other parsable format, and then scanning the audio or text data to determine a particular function or command for bot C 218 to execute. If bot C 218 determines that the message does not invoke functionality of bot C 218, or includes a command that bot C 218 does not recognize, it may disregard the message or sent a response message 210 that indicates that no command was recognized.

A response message 210 may be generated by bot C 218 with result information for a user command in audio format, or in a text format that may be converted to an audio format by message processing node 206 of the GCS 102. The response message 210 may also include information or metadata identifying a target group or user node to which the message should be sent via the GCS 102.

If bot C 218 does recognize a command in the user message 204, bot C 218 may generate a bot message 214 to send to the bot proxy node 122. Bot message 214 may include various identifying information or metadata, such as a bot ID for bot C 218 (which may include a unique identifier for a particular bot instance 208), a message ID for the bot message 214, a type of command to be executed at the bot service LAN 106, and one or more variables to define the parameters of the command type. For example, for a hotel management bot C 218, a command type may include a request to send items to a particular room, where the variables may include one or more items to deliver, the room number, and a priority level. The type of command and relevant variables may be extracted by bot C 218 from the audio data of the user message 204. In some embodiments, bot C 218 may format the command type and variables into an API format that can be processed by a target server of the bot service LAN 106. Bot C 218 may maintain addressing information, encryption information, or other information that can be used to generate the bot message 214 and send it across network 104, so that it will be received and accepted at the bot proxy node 122.

Bot proxy node 122 may receive the bot message 214 and perform command processing instructions 220, which may include executing program code or method 500B, where 500B may correspond to the method flow diagram 500B of FIG. 5. The bot proxy 122 may verify the source or authenticity of the bot message 214, including performing decryption or digital signature verification. The bot proxy 122 may also determine a target server from a plurality of servers of the bot service LAN 106 based on the command or other metadata included in the bot message 214. For example, bot service LAN 106 may include a bot service server 1 216A, bot service server 2 216B, and bot service server 3 216C. Each bot service server may be configured to service or perform different types of commands, may be configured to distribute a processing load of incoming commands, or otherwise may be configured to work together or independently to service incoming commands from one or more bots. For example, bot service server 1 216A may handle reservation requests for a hotel, bot service server 2 216B may handle maintenance and cleaning requests from hotel staff, and bot service server 3 216C may handle service requests from hotel patrons. In some embodiments, the different command types may originate from different bots, different instances of a same bot in different origin groups, or all from a single bot in a single group. The bot proxy 122 may identify a target server 216 based on a command type, bot ID, server load distribution, other factors, or any combination thereof. The bot proxy 122 may store or access LAN addressing information 222 to determine where to send each message to reach the determined target server 216.

Command processing instructions 220 may also direct the bot proxy 122 to generate an API instruction or command based on the received bot message 214 and the target server 216. For example, different servers 216 may accept commands in different API formats, and the bot proxy 122 includes instructions 220 on which API format to use based on the target server. Alternately, the bot message 214 may include a pre-formatted API instruction for the bot proxy to forward to the target server 216.

After sending a command to a target server 216, the bot proxy 122 may wait to receive a response from the target server 216, including a result or acknowledgement for the command. The bot proxy 122 may generate a response message 224, which may include a target bot ID, message ID, and a response data payload indicating the results from the target server 216. The bot C 218 may receive the response 224, and may generate a response message 210 to send to one or more user nodes 108 of group 202 in response to the user message 204. The result information in the response message 210 may be converted from a text format to an audio format by bot C 218, by message processing node 206, or may be sent to group 202 in a text format. Response message 210 may be encoded for transmission by message procession module 206 of GCS 102. The response message 210 may be received at transmission devices 112 of user nodes 108 in group 202, and may be presented as an audio or text message at transmission device 112 or personal device 116. An example method flow diagram for system 200 is discussed in regard to FIG. 3.

Figure 3:
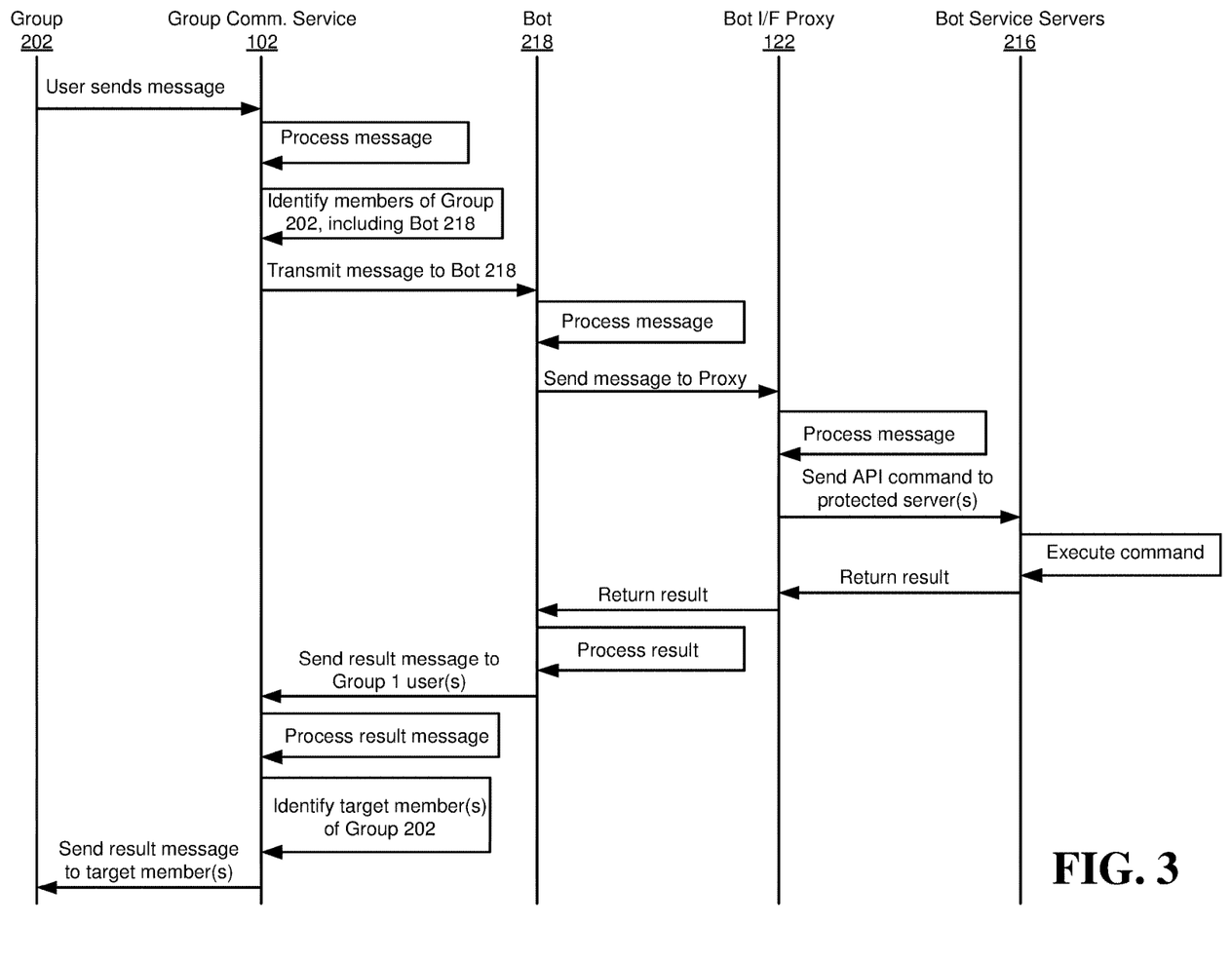
FIG. 3 is a method flow diagram of a system including a bot proxy for a group communication service, in accordance with certain embodiments of the present disclosure.

FIG. 3 is a method flow diagram of a system including a bot proxy for a group communication service, in accordance with certain embodiments of the present disclosure. The method flow diagram illustrates information sent between and operations performed at elements of system 200, such as group 202, GCS 102, bot 218, bot interface proxy 122, and bot service server(s) 216. The method flow may proceed from the top to the bottom of FIG. 3, although some elements may be performed in a different order from that depicted, omitted, or additional elements may be performed that are not illustrated.

A user node included in group 202 may send a message to GCS 102. GCS 102 may process the message, such as performing decryption, error correction, decompression, data extraction, speech-to-text conversion, trigger phrase searches, other operations, or any combination thereof. Based on information extracted from the user message, the GCS 102 may identify members of group 202, including bot 218, for example by accessing a user groups database. The GCS 102 may then transmit the user message, or data from the user message, to bot 218. The message may be transmitted over a network if bot 218 is not hosted or executed at the GCS 102, or the message may be passed to an instance of the bot executing on a GCS 102 server, computer, or processor. In some embodiments, the GCS 102 may determine whether the user message includes a trigger phrase that invokes bot 218 before sending the message to the bot 218.

The bot 218 may receive and perform processing on the message. Processing may include converting the message from speech to text format, or parsing the message to determine whether the message includes one or more trigger phrases to invoke an operation of the bot 218. If the message does invoke functionality of the bot 218, the bot 218 may extract information relevant to the bot operation from the message, such as a command type and variable information that may be used to execute the bot functionality. Processing the message may also include generating and sending a message to the bot proxy 122, which message may include a command type, variables, a target server, an API instruction or command, other information, or any combination thereof. The bot 218 may encrypt or digitally sign the message to authenticate the message to the bot proxy 122.

The bot proxy 122 may receive the message from bot 218, and may perform processing on the message, such as decrypting the message, extracting a command type and variables data from the message, determining a target bot service server 216 for the command, generating an API command for execution at the sever 216, performing other processing, or any combination thereof. The bot proxy 122 may determine an address of the target server within the secured LAN that includes the bot proxy 122 and bot servers 216, and transmit an API command to the target protected server 216. The bot service server 216 may execute the command and return a result to the bot proxy 122. The bot proxy 122 may generate a message to return the result to the bot 218, encrypt or otherwise encode the message, and transmit the message to the bot 218 (e.g. based on addressing or bot ID information included in the message received from the bot 218).

Bot 218 may receive the result from the bot proxy 122, and process the result. Processing may include extracting result information, generating a result message to send to one or more users of group 202, performing text-to-speech conversion, other processing, or any combination thereof. The bot 218 may send the result message to the GCS 102 for broadcasting to one or more member user nodes of group 202.

Figure 4:
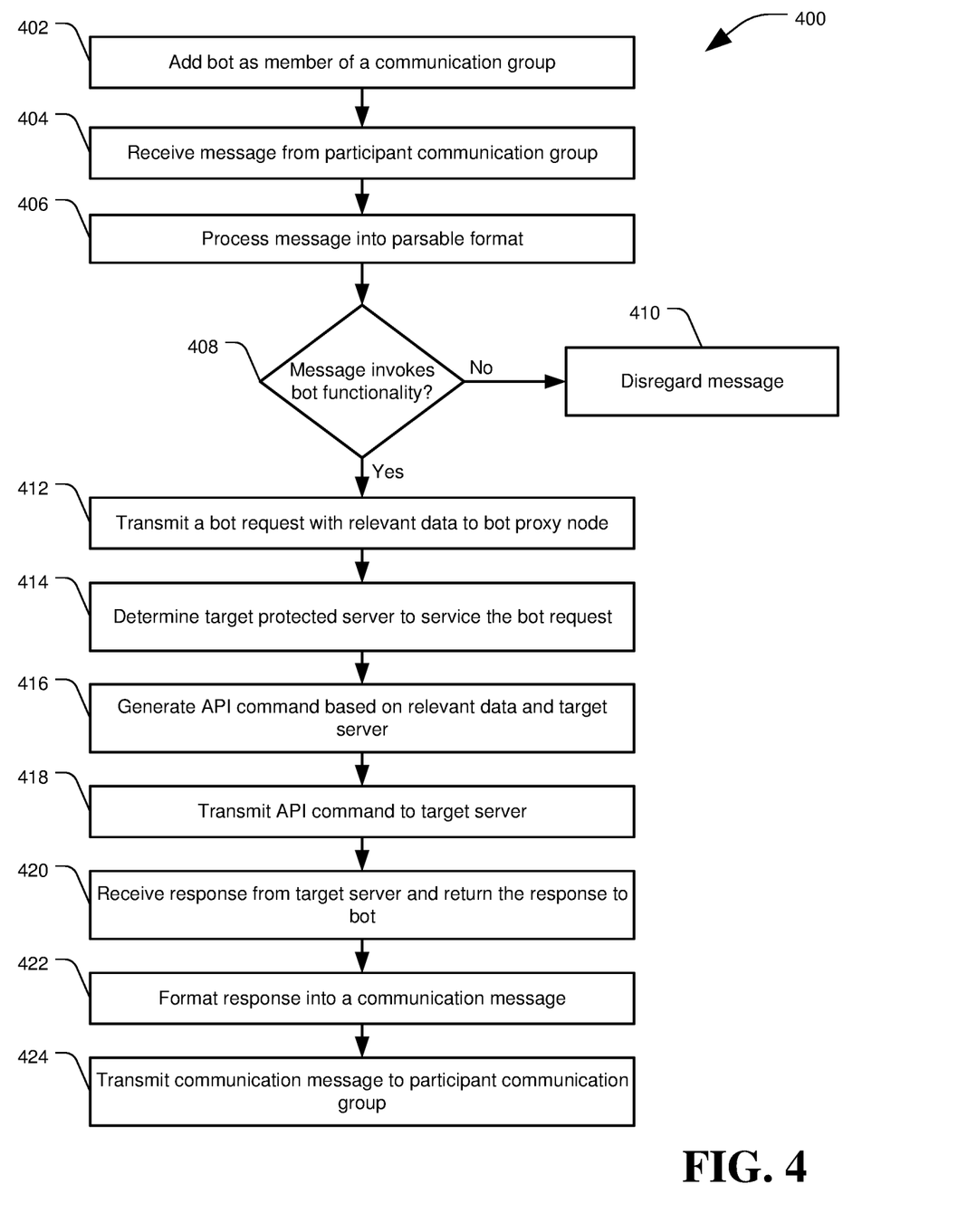
FIG. 4 is a flow diagram for a method of using a bot proxy for a group communication service, in accordance with certain embodiments of the present disclosure.

The GCS 102 may process the result message, such as by converting a text result message to an audio format using a text-to-speech converting service or system, and putting the result message in a format suitable for transmission over the network 104. The GCS 102 may identify one or more target members of group 202, for example by looking up addresses of user nodes in group 202 based on a group ID included with the result message from the bot 218. In some embodiments, the result message may be transmitted to only a subset of members of group 202, which may be based on user node identifiers included with the original user message or the result message from the bot 218. For example, the result message may only be sent to the user node that transmitted the message including the bot trigger phrase. The GCS 102 may transmit the result message to the identified recipient(s) from group 202. FIG. 4 illustrates a flowchart for another method of using a bot proxy for group communication services as described herein.

FIG. 4 is a flow diagram for a method 400 of using a bot proxy for a group communication service, in accordance with certain embodiments of the present disclosure. The method 400 may be performed by components of a group messaging architecture, such as group communication service 102, bot C 218, and bot proxy I/F node 122 of system 200.

The method 400 may include adding a bot as a member of a communication group, at 402. For example, an administrator for a communication group, or of the GCS, can use an interface portal (such as a website or mobile app) to add a bot as a member of the communication group. An administrator may select the bot to add from a library of pre-existing bots stored at and executed by the GCS. A new bot may be uploaded to the library of bots for hosting at the GCS. Alternately, an IP address or other addressing information may be provided for a bot hosted remotely from the GCS.

At 404, a message may be received from a communication group in which the bot is a participant. The message may be processed into a parsable format, at 406, such as by converting audio speech data into a text format. The parsable data may be analyzed to determine whether the message invokes a function of the bot, at 408. For example, the message data may be searched for one or more trigger phrases or keywords to invoke a bot response. If the message does not invoke bot functionality, the method 400 may include disregarding the message, at 410.

If the message does invoke bot functionality, the method 400 may include transmitting a bot request, including data relevant to the invoked bot function, from a bot to a bot proxy node, at 412. For example, a command type, one or more command variables, a bot ID, group ID, user node ID, message ID, or other information may be sent to the bot proxy. At 414, the method 400 may include determining a target protected server of a bot service LAN to service the bot request. The target protected server may be selected based on a command type, a group ID, a bot ID, server processing loads, other information, or a combination thereof. Method 400 may include generating an API command based on the relevant data from the bot request and the target server, at 416, and transmitting the API command to the target server, at 418.

At 420, a response may be received from the target server, and the response may be transmitted to the bot. The response may then be formatted into a communication message for submission to one or more user nodes of the group that sent the message invoking the bot functionality, at 422. For example, a result from the target server may be incorporated into a natural-language message, and a spoken audio form of the result message may be generated for transmission to user nodes. At 424, the method 400 may include transmitting the communication message to the communication group in which the bot is a participant member.

In some embodiments, various steps of the methods disclosed herein may be omitted. For example, some bot operations may not result in a response message being sent to the group. In an exemplary embodiment, a user command to have the bot update a database may be performed by the bot silently, without the need to relay a response from a bot service server to members of the group. In such an embodiment, steps 420 through 424 may be omitted.

FIG. 5 depicts another a flow diagram for a method of using a bot proxy for a group communication service, in accordance with certain embodiments of the present disclosure. The method of FIG. 5 may be conceptually divided into method steps 500A, which may be performed by a bot, and method steps 500B, which may be performed by a bot proxy I/F node. The method of FIG. 5 may be performed by components of a group messaging architecture, such as bot C 218 and bot proxy I/F node 122 of system 200.

Beginning at 502 of method 500A, a bot may receive a message from a user in a group in which the bot is a member or participant. At 504, the bot may convert the message from an audio data format to a text format, for example using a speech-to-text converter. The bot may process the message to detect a trigger phrase, at 506. For example, the bot may search the user message for one or more keywords that triggers a response from the bot. Trigger phrases may include a "name" for the bot, or a command phrasing that the bot is configured to recognize. The bot may identify a selected command based on the trigger phrase, or based on employing language parsing algorithms after a trigger phrase is detected, at 508. The bot may transmit information relevant to the selected command to a bot proxy node associated with the bot, at 510.

In method 500B, the bot proxy node may receive the transmission from the bot, and may determine a target server from a plurality of servers within a secured LAN based on the selected command, at 512. The bot proxy may generate an API instruction based on the information from the bot, the target server, other factors, a combination thereof, at 514. At 516, the bot proxy may transmit the API instruction to the target server, and may receive a response from the target server at 518. The bot proxy may transmit result information to the bot based on the response, at 520.

Resuming in method 500A, the bot may receive the result information from the bot proxy, and generate a response message based on the result information, at 522. The bot may format the response message into a natural language sentence or phrase configured to communicate the results of the selected command to a human recipient. At 524, the bot may send the response message to the participant group, or to a subset of the user nodes of the recipient group, via a GCS. An example computing system configured to perform the methods and operations described herein is discussed in regard to FIG. 6.

Figure 6:
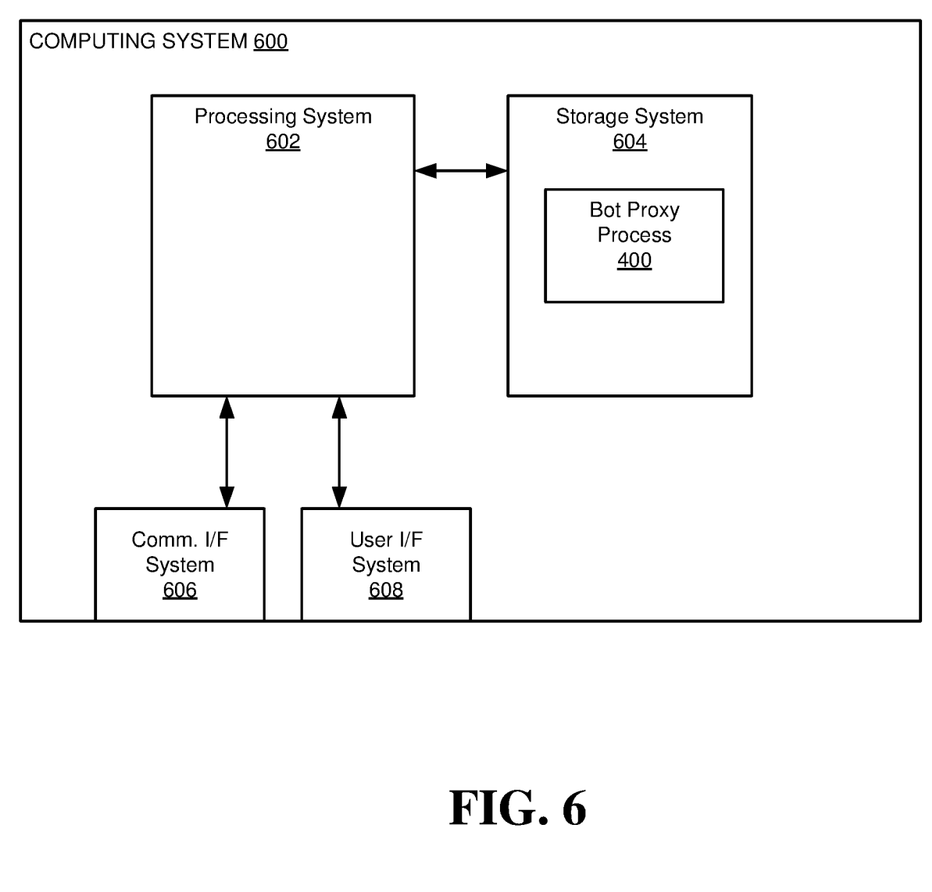
FIG. 6 is a diagram of a system including a bot proxy for a group communication service in accordance with certain embodiments of the present disclosure.

FIG. 6 is a diagram of a system 600 including a bot proxy for a group communication service in accordance with certain embodiments of the present disclosure. The computing system 600 may be one or more devices configured to perform the operations for a group communication service and bot proxy, including operations of the method flow diagram of FIG. 3, the method of FIG. 4, and the method of FIG. 5. In some examples, the computing system 600 may include or be an example of one or more user devices 112 or 116, one or more computers operating at the group communication service (GCS) 102, one or more computers running a bot instance, one or more computers of a bot proxy I/F node 122, one or more servers 216 of a bot service LAN 106, or other computing devices of a group communication system architecture.

The computing system 600 may include a processing system 602, a storage system 604, a communication interface (I/F) system 606, and a user I/F system 608. The one or more of the components of the computing system 600 may be included on a single integrated circuit (e.g. a system on a chip, SoC), may be distributed among several circuits or hardware components, may be implemented as firmware or software modules executed by microprocessors, or in other configurations.

The processing system 602 may include one or more microprocessors or integrated circuits, such as application-specific integrated circuits (ASICs), field programmable gate arrays (FPGAs), or other processor designs. The processing system 602 may include associated memory such as random access memory (RAM), static RAM (SRAM), dynamic RAM (DRAM), or other volatile or nonvolatile memory. The processing system 602 may load instructions, executable code, or pending commands to the memory during operation.

The storage system 604 may include one or more nonvolatile data storage devices, such as hard disk drives, NAND Flash memory drives, read only memory (ROM), or other memory devices. The storage system 605 may store computer-readable instructions in the form of software or firmware code, which can be loaded into a memory of the processing system 602 and executed to cause a processor to perform a method according to the instructions. For example, the storage system 604 may store instructions for a bot proxy process 400, which may correspond to one or more steps of the method 400 of FIG. 4. The storage system may also store other information, such as communication group databases, bot-accessible databases or software systems, or other information or software instructions.

Communication I/F system 606 may include one or more wired or wireless communication I/F circuits allowing the computing system 600 to communicate with other devices over a network or other remote connection. For example, communication I/F system 600 may include an Ethernet port, a Wi-Fi transceiver, a Bluetooth transceiver, or other interface protocol elements.

User I/F system 608 may include one or more systems with which a user can interact, or which allow user interface devices to be connected to computing system 600. For example, user I/F system 608 may include a display screen or monitor, a touch screen interface, a pointer device such as a mouse or trackpad, a keyboard, a speaker, a microphone, other devices, or a port that allows such devices to connect to the computing system 600, such as a universal serial bus (USB) port.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   receiving, at a bot active in a selected group of users of a group communication service, a message from a user in the selected group, the bot comprising a software application configured to execute commands in response to messages from users of the selected group;
   transmitting, from the bot to a bot proxy node within a secured local network, information related to the message that is relevant to execute a selected command;
   transmitting, from the bot proxy node to a target server within the secured local network, an application programming interface (API) instruction to perform the selected command at the target server;
   sending, from the bot via the group communication service, a response message to at least one user of the selected group based on a result of the selected command; and
   receiving, at the bot proxy node, command transmissions from multiple instances of the bot, each instance of the bot being active in a different group of users of the group communication service, the command transmissions from the multiple instances including an identifier for a respective bot instance to which to transmit a response.

2. The method of claim 1 further comprising:
   processing, at the bot, the message to detect a trigger phrase to invoke an operation at the bot; and
   identifying, at the bot, the selected command based on the trigger phrase.

3. The method of claim 2 wherein:
   the group communication service exchanges audio messages between users in the selected group; and
   the message is received at the bot in a text format from a speech-to-text converter of the group communication service.

4. The method of claim 2 further comprising:
   receiving the message at the bot in an audio format;
   converting, at the bot, the message into a text format; and
   processing, at the bot, the message in the text format to detect the trigger phrase.

5. The method of claim 4 further comprising:
   generating, at the bot, the response message in the text format;
   converting, at the bot, the response message from the text format to the audio format; and
   sending the response message to the at least one user in the audio format.

6. The method of claim 1 further comprising:
   generating, at the bot, the API instruction corresponding to the selected command; and
   transmitting the API instruction from the bot to the bot proxy node as the information related to the message.

7. The method of claim 1 further comprising generating, at the bot proxy node, the API instruction based on the information related to the message.

8. The method of claim 1 wherein:
   the bot is executed at a system external to the secured local network;
   the bot proxy node is a computing device connected to the secured local network and located behind a firewall of the secured local network;
   the bot communicates with the bot proxy server via the internet; and
   the bot proxy node is configured to shield the target server from direct internet access.

9. The method of claim 1 wherein:
   the bot proxy node is connected to a plurality of servers within the secured local network; and
   the method further comprises determining, at the bot proxy node, the target server from the plurality of servers based on the selected command.

10. The method of claim 9 wherein:
    different servers from the plurality of servers are configured to execute different types of commands from the bot; and
    the bot proxy node determines the target server by matching the selected command with a command processing functionality of the target server.

11. The method of claim 1 further comprising:
    receiving, at the bot proxy node, a response from the target server based on the result of the selected command;
    transmitting, from the bot proxy node to the bot, result information based on the response; and
    generating, at the bot, the response message based on the result information.

12. A communication system comprising:
    a first computing device configured to execute a bot to participate in a selected group of users of a group communication service, the bot comprising a software application configured to execute commands in response to messages from users of the selected group;
    a second computing device within a secured local network configured to execute a bot proxy node, the bot proxy node configured to exchange communications between the secured local network and the bot;
    wherein the first computing device is external to the secured local network, and the bot communicates with the bot proxy server via the internet;
    wherein the second computing device is connected to the secured local network and located behind a firewall of the secured local network, and the bot proxy node is configured to shield the target server from direct internet access;
    wherein the bot and the bot proxy node are configured to perform a communication process including:
      receiving, at the bot, a message from a user in the selected group;
      transmitting, from the bot to a bot proxy node, information related to the message that is relevant to execute a selected command;
      transmitting, from the bot proxy node to a target server within the secured local network, an application programming interface (API) instruction to perform the selected command at the target server; and
      sending, from the bot via the group communication service, a response message to at least one user of the selected group based on a result of the selected command.

13. The communication system of claim 12 further comprising:
    the bot is further configured to:
      process the message to detect a trigger phrase to invoke an operation at the bot; and
      identify the selected command based on the trigger phrase.

14. The communication system of claim 13 wherein:
    the group communication service exchanges audio messages between users in the selected group; and the message is received at the bot in a text format from a speech-to-text converter of the group communication service.

15. The communication system of claim 13 further comprising:
the bot is further configured to:
receive the message in an audio format;
convert the message into a text format;
process the message in the text format to detect the trigger phrase;
generate the response message in the text format;
convert the response message from the text format to the audio format; and
send the response message to the at least one user in the audio format.

16. The communication system of claim 12 wherein:
the first computing device includes a first communication interface to the internet;
the second computing device includes:
a second communication interface to the internet;
a third communication interface to the target server.

17. The communication system of claim 12 wherein:
the bot proxy node is further configured to receive command transmissions from multiple instances of the bot, each instance of the bot being active in a different group of users of the group communication service; and
command transmissions from the multiple instances include an identifier for a respective bot instance to which to transmit a response.

18. A method for executing commands through a bot in a group communication service, the method comprising:
adding the bot as a member of a selected group of users of the group communication service, wherein the users can broadcast audio messages to other users of the selected group;
receiving, at the bot, a message from a user in the selected group;
processing, at the bot, the message to determine a selected command to execute based on a trigger phrase included in the message;
transmitting, over the internet, information relevant to the selected command from the bot to a bot proxy node within a secured local network;
transmitting, from the bot proxy node to a target server within the secured local network, an application programming interface (API) instruction to perform the selected command at the target server;
wherein:
the bot is executed at a system external to the secured local network;
the bot proxy node is a computing device located behind a firewall of the secured local network;
the bot communicates with the bot proxy server via the internet; and
the bot proxy node is specially configured to process communications from the bot in order to shield the target server from direct internet access.

19. The method of claim 18 further comprising:
sending, from the bot to at least one user of the selected group via the group communication service, an audio response message based on a result of the selected command.

20. The method of claim 18 further comprising:
receiving, at the bot proxy node, command transmissions from multiple instances of the bot, each instance of the bot being active in a different group of users of the group communication service; and
wherein command transmissions from the multiple instances include an identifier for a respective bot instance to which to transmit a response.

* * * * *